United States Patent
Frommann et al.

(10) Patent No.: US 9,033,391 B2
(45) Date of Patent: May 19, 2015

(54) FLAP ASSEMBLY FOR A MOTOR VEHICLE

(71) Applicant: GM Global Technology Operations LLC, Detroit, MI (US)

(72) Inventors: Markus Frommann, Bingen am Rhein (DE); Heiko Betzen, Bausendorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/091,358

(22) Filed: Nov. 27, 2013

(65) Prior Publication Data

US 2014/0183899 A1 Jul. 3, 2014

(30) Foreign Application Priority Data

Nov. 28, 2012 (DE) .................... 10 2012 023 657

(51) Int. Cl.
*B60K 15/05* (2006.01)
*B62D 25/00* (2006.01)
(Continued)

(52) U.S. Cl.
CPC ......... *B60K 15/05* (2013.01); *B60K 2015/0561* (2013.01); *B60K 2015/053* (2013.01); *E05B 83/34* (2013.01); *E05C 19/02* (2013.01)

(58) Field of Classification Search
CPC .... B44C 1/10; B44F 1/08; B60W 2510/0638; B60W 2510/0657; B60W 2710/0605; B60W 2710/0666; B60W 2710/105; B60K 15/05; B60K 2015/0561; B60K 2015/0576; B60K 15/04; B60K 2015/0419; B60K 2015/0445; B60K 2015/053; B60K 2015/0538; B60K 2015/0553; B60K 31/04; E05B 83/34; E05B 79/20; E05B 47/0004; E05B 81/08; E05B 47/023; E05B 47/026; E05B 63/0069; E05B 63/06; E05B 81/20; E05B 83/16
USPC ............... 296/97.22, 37.6; 180/202; 292/207, 292/201, 280, 144; 49/394
See application file for complete search history.

(56) References Cited

U.S. PATENT DOCUMENTS

| 4,266,816 A | 5/1981 | Mukai et al. |
| 5,044,678 A | 9/1991 | Detweiler |

(Continued)

FOREIGN PATENT DOCUMENTS

| DE | 4242228 A1 | 6/1994 |
| DE | 102005060781 A1 | 6/2007 |

(Continued)

OTHER PUBLICATIONS

German Patent Office, German Patent Search Report for Application No. 102012023657.3, mailed Sep. 10, 2013.

(Continued)

*Primary Examiner* — Glenn Dayoan
*Assistant Examiner* — Sunsurraye Westbrook
(74) *Attorney, Agent, or Firm* — Ingrassia Fisher & Lorenz P.C.

(57) ABSTRACT

A flap assembly is provided for a motor vehicle, with a base, in particular a prestressed flap, in particular a fuel filler flap, which is movably mounted relative to the base in a closing direction, and exhibits a latching element with a stop, which in a closing position engages a counter-stop of the base from the back, so as to counteract an opening of the flap opposite the closing direction, and a movable unlocking element, which in an unlocking position counteracts an engagement of the counter-stop by the stop from the back.

16 Claims, 2 Drawing Sheets

(51) Int. Cl.
 *E05B 83/34* (2014.01)
 *E05C 19/02* (2006.01)

(56) References Cited

U.S. PATENT DOCUMENTS

| | | | |
|---|---|---|---|
| 5,076,622 A | 12/1991 | Detweiler | |
| 5,533,766 A | 7/1996 | Faerber | |
| 5,658,036 A * | 8/1997 | Benoist | 296/97.22 |
| 5,769,481 A * | 6/1998 | Cooper | 296/97.22 |
| 5,906,405 A * | 5/1999 | Cooper | 296/97.22 |
| 2002/0008402 A1 | 1/2002 | Moll et al. | |
| 2002/0082764 A1 | 6/2002 | Ikeda | |
| 2002/0130531 A1* | 9/2002 | Leitner | 296/97.22 |
| 2005/0194810 A1 | 9/2005 | Beck | |
| 2005/0208276 A1 | 9/2005 | Pommeret et al. | |
| 2008/0136210 A1* | 6/2008 | Scott et al. | 296/97.22 |

FOREIGN PATENT DOCUMENTS

| | | |
|---|---|---|
| EP | 1571029 A2 | 9/2005 |
| FR | 2930201 A1 | 10/2009 |
| WO | 2007116195 A2 | 10/2007 |

OTHER PUBLICATIONS

Intellectual Property Office, Search Report under Section 17(5) for United Kingdom Patent Application No. GB1319846.0, issued May 29, 2014.

* cited by examiner

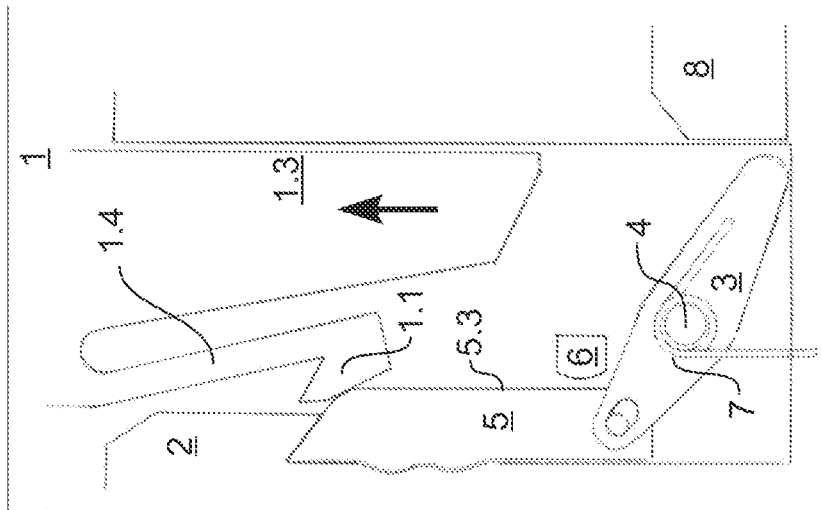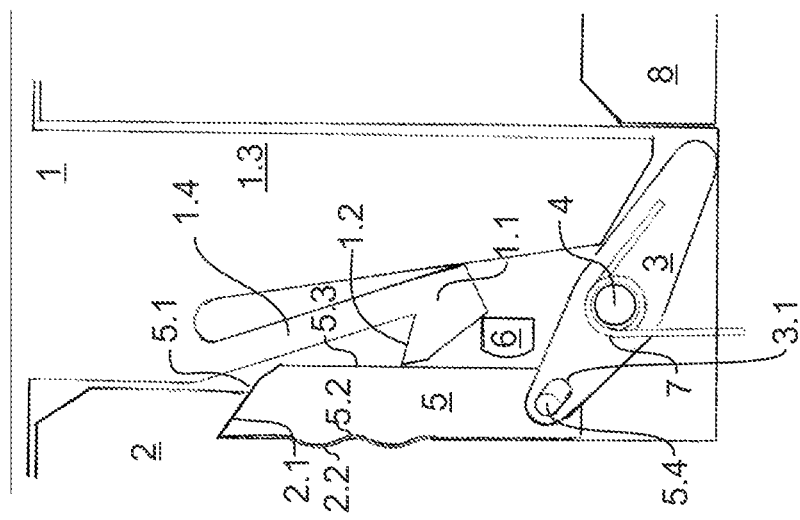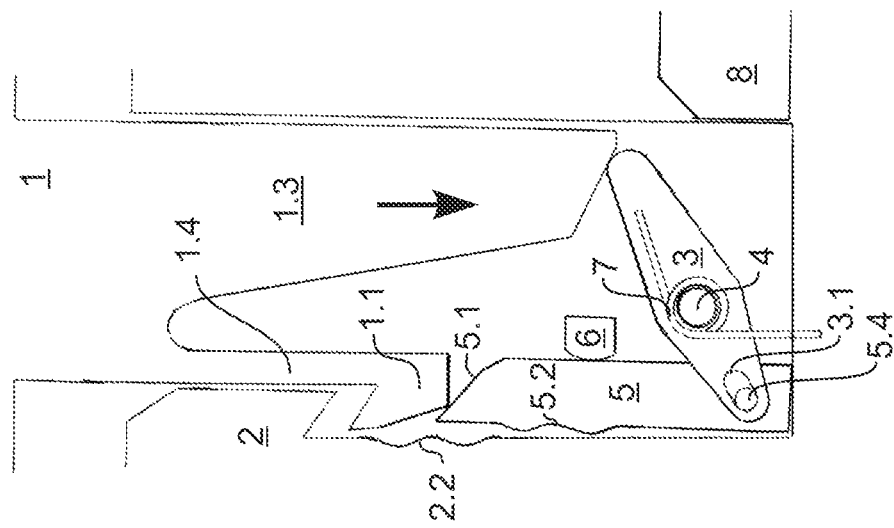

FLAP ASSEMBLY FOR A MOTOR VEHICLE

CROSS-REFERENCE TO RELATED APPLICATION

This application claims priority to German Patent Application No. 10 2012 023 657.3, filed Nov. 28, 2012, which is incorporated herein by reference in its entirety.

TECHNICAL FIELD

The technical field relates to a flap assembly for a motor vehicle with a flap, in particular a fuel filler flap, a motor vehicle with such a flap assembly, and a method for actuating such a flap assembly.

BACKGROUND

Known from DE 10 2004 010 294 A1 is a tank trough for automobiles with a locking element movably mounted in the trough and a motor-activated actuation device for displacing the locking element into an unlocking position.

At least object is to provide an improved vehicle with a flap assembly and/or to improve the activation of a movable flap in a motor vehicle, in particular a fuel filler flap. In addition, other objects, desirable features and characteristics will become apparent from the subsequent summary and detailed description, and the appended claims, taken in conjunction with the accompanying drawings and this background.

SUMMARY

In one embodiment, a flap assembly is provided for a motor vehicle exhibits a base, which in an embodiment is detachably or undetachably secured to the body of the motor vehicle. In an embodiment, the base can be molded as a single or multiple part(s) and/or as a molded part, in particular out of plastic and/or metal. In an embodiment, the base is designed as a tank trough.

The flap assembly further exhibits a flap, in particular a fuel filler flap, which is movably mounted relative to the base in a closing direction, in particular around one or more axes, in one embodiment on the base and/or body of the motor vehicle. A closing direction can in particular be a tangential direction in a pivoting motion of the flap, in particular, given a flap rotatably mounted around a rotational axis, a normal on the radius around the rotational axis.

In an embodiment, the flap is pre-stressed, in particular elastically, in a further development with a spring arrangement with at least one clock spring and/or at least one tension spring. In an embodiment, the flap can be pre-stressed against the closing direction, so as to expose the flap against the base or body after unlocked, at least to an extent that a flap edge can be manually engaged from the back so as to completely open the flap, for example to uncover a tank opening. Likewise, the flap can be pre-stressed in the closing direction in an embodiment, so as to draw the flap against the base or body when not in use, thereby preventing it from inadvertently protruding.

In an embodiment, the flap is at least essentially flat, in particular designed without any local bulging, as provided in conventional fuel filler flaps to allow access from the back using at least one finger with the flap closed. A flat flap is also understood as a flap exhibiting a curvature that traces the body. The flap exhibits a latching element with a stop. The latter can be designed as a single piece with the flap, in particular molded, or be joined with the latter detachably, in particular frictionally and/or positively, for example through latching, bolting or the like, or undetachably, in particular frictionally and/or materially, for example through riveting, adhesive bonding, welding or the like.

In an embodiment, the latching element with the stop is designed in such a way that the stop can or does engage a fixed counter-stop of the base from the back in a closed state, so as to counteract, in particular prevent, an opening of the flap against the closing direction, in particular positively and/or frictionally.

In an embodiment, the flap assembly exhibits a movably, in particular displaceably, mounted unlocking element, which in an unlocking position is designed to counteract a rearward engagement of the counter-stop by the stop, in particular to prevent a rearward engagement. In this way, the stop can be passed by the counter-stop for opening the flap without engaging it from the back. In an embodiment, the unlocking element is accordingly designed to positively pass the stop by the counter-stop when it is in the unlocking position.

In an embodiment, the unlocking element can be designed in such a way as to completely or partially cover, in particular overhang, the counter-stop in the unlocking position, or to protrude over the counter-stop. In an embodiment, the counter-stop can be formed or defined by the face of in particular a grooved recess in the base. In a further embodiment, the unlocking element can be arranged in this recess at least in the unlocking position, and in a further development protrude out of the latter, so that the stop of the latching element in a further development cannot mesh into the recess, and thereby engage the counter-stop from the back, at least in proximity to the counter-stop. In an embodiment, the unlocking element can be displaceably guided in the recess.

In an embodiment, the unlocking element can exhibit a contact surface set up to positively guide the stop at least in the unlocking position, in particular past the counter-stop. In a further embodiment, this contact surface can at least essentially be parallel to the closing direction or inclined toward the closing direction. In an embodiment, the stop can contact the contact surface when the unlocking element is in the unlocking position, and the stop is being or has been inserted in the closing direction beyond the counter-stop. If the unlocking element overhangs the counter-stop in the unlocking position or protrudes over the counter-stop, the stop can be reliably guided against the closing direction beyond the counter-stop.

In an embodiment, the flap assembly exhibits an adjusting device set up to move the unlocking element into the unlocking position. In a further development, the adjusting device can be activated by an insertion motion of the flap in the closing direction, in particular by an insertion motion of the flap in the closing direction beyond the closing position, in a further development only by an insertion motion of the flap in the closing direction beyond a clearance position situated downstream from the closing position in the closing direction. In other words, a clearance in the closing direction of the flap can be provided between the closing position and actuator of the adjusting device, in particular to offset tolerances, relative movements and the like.

In a further development, the adjusting device can be in particular mechanically activated by an insertion motion of the flap, and to this end mechanically convert an insertion motion of the flap into a movement by the unlocking element in the direction toward the unlocking position. In an embodiment, the flap exhibits an unlocking plunger to move the adjusting device in the closing direction given an insertion motion of the flap.

In a further embodiment, the adjusting device exhibits a rotatably mounted rocker that can be twisted by an insertion motion of the flap, in particular by the unlocking plunger described above, and in so doing move the unlocking element in the direction toward the unlocking position. In a further development, the rocker can be coupled with the unlocking element, in particular with a gate slide.

If the flap is inserted in the closing direction beyond the closing or clearance position, the stop is released from the counter-stop, and the unlocking element is moved in the unlocking position. If the flap is then moved back or retracted along the closing direction, in particular by its pre-stressing, the unlocking element counteracts a hooking between the stop and counter-stop, so that the flap can be opened. In this way, the flap can be unlocked via continued insertion and opened.

In an embodiment, the adjusting device is pre-stressed, in particular elastically, preferably by a spring arrangement with at least one clock spring and/or at least one tension spring. In particular, the adjusting means can be prestressed in particular against the unlocking position or so as to try and distance the unlocking element from the unlocking position. In this way, in particular when the unlocking element is not fixed in the unlocking position, the unlocking element can be automatically removed from the unlocking position, so as to thereby allow the stop to engage the counter-stop from the back, and thus lock the flap on the base.

In an embodiment, the adjusting device can be locked by a locking element, so as to counteract, in particular prevent, a movement by the unlocking element into the unlocking position. As long as the locking element counteracts, in particular prevents, a movement by the unlocking element into the unlocking position, the stop engages the counter-stop from the back once reaching the closing position, and thereby counteracts an opening of the flap. This makes it possible to counteract an undesired opening of the flap.

The locking element can in particular positively lock the adjusting device, preferably by exhibiting a movable locking element stop, which counteracts a movement by the adjusting device for moving the unlocking element into the unlocking position. In an embodiment, the locking element can be activated or is activated electromotively, pneumatically and/or hydraulically. In an embodiment, the locking element can be activated or is activated by a closing system of the motor vehicle, in particular a central locking system.

In an embodiment, the unlocking element is fixed in the unlocking position, in particular by the latching element. In a further development, the flap assembly is designed in such a way that the latching element fixes the unlocking element in the unlocking position for as long as the latter is inserted in the closing direction beyond the closing position.

In particular for this purpose, the unlocking element can in one embodiment exhibit a gearing designed to interact with a counter-gearing of the base in the unlocking position, so as to counteract, in particular prevent, a movement by the unlocking element out of the unlocking position. A gearing and counter-gearing interacting therewith is understood in particular as an arrangement of one or more projections and complementary depressions.

In particular to be able to advantageously move the unlocking element into the unlocking position, the unlocking element can in a further development be guided with a clearance transverse to the gearing. In general, the unlocking element can in one embodiment be displaceably guided on the base, in particular in the direction toward the counter-stop and/or opposite the closing direction.

In an embodiment, the latching element is designed so that it can move transverse to the closing direction, in particular so that it can engage the counter-stop from the back or be passed by the latter via the unlocking element. In a further embodiment, the latching element is designed to be elastically deformed by the unlocking element when the latter guides the stop past the counter-stop. Additionally or alternatively, the latching element can also have been elastically deformed or be elastically deformed by the base before reaching the closing position, so as to be latched in upon reaching the counter-stop.

In a further embodiment, the latching element can frictionally fix the unlocking element in a position inserted in the closing direction beyond the closing direction. In an embodiment, the latching element can in particular be elastically stressed against the unlocking element by the unlocking element in the unlocking position, so as to press the latter against the base, in particular a gearing, on the one hand, and thereby fix it in place when the latching element is inserted in the closing direction beyond the closing position.

Additionally or alternatively, the latching element in a position upstream from the closing position in the closing direction can be elastically pre-stressed transverse to the closing direction toward the counter-stop, so as to thereby latch in upon reaching the counter-stop. In particular for this purpose, the base can exhibit a guiding surface, which in a further development can at least essentially be parallel to the closing direction, and exhibits a recess transverse, in particular perpendicular or inclined, to the closing direction, which defines the counter-stop. The guiding surface and latching element can be designed in such a way that the latching element becomes or is elastically deformed by the guiding surface in at least a position upstream from the closing position in the closing direction, so that the stop is pre-stressed toward the counter-stop, so as to snap in behind and latch with the latter after the closing position has been reached.

In an embodiment, the stop is designed like a hook or engages the preferably complementarily shaped counter-stop from the back like a hook. In particular, the stop can be bent or at least essentially planar in design, and inclined opposite the closing direction, in particular forming an angle with the latter that is less than or equal to about 90°, in particular measuring at most about 60°. The stop is inclined in particular against the closing direction when swept in the closing direction in such a way as to hook a complementary counter-stop during a movement opposite the closing direction. This makes it possible to increase the reliability of the flap locking system.

The unlocking element can exhibit a run-up contour, in particular a run-up incline, for contacting the latching element. If the flap assembly in one embodiment is designed so that the latching element runs onto the unlocking element during insertion in the closing direction, such a run-up contour can improve this process. In an embodiment, the run-up contour can border, in particular traverse over, the contact surface described above, which is set up to positively guide the stop in the unlocking position. In an embodiment, at least part of the run-up contour can simultaneously be at least part of the contact surface described above. In particular, the run-up contour can exhibit a section that covers the counter-stop in the unlocking position, and another section that protrudes over the latter, and forms at least part of the contact surface, which is set up to positively guide the stop in the unlocking position.

In an embodiment, the counter-stop is complementarily designed to the stop, in particular to improve a positive hooking between the stop and counter-stop. Additionally or alternatively, the counter-stop can be complementarily designed to the unlocking element, in particular a run-up contour of the unlocking element for contacting the latching element. In particular, the unlocking element can in one embodiment contact or engage the counter-stop from the back instead of the stop, so as to thereby counteract a rearward engagement of the counter-stop by the stop, and likewise be fixed in place in the unlocking position by the counter-stop.

In another embodiment, the flap is for closing purposes moved in the closing direction, until the stop engages behind the counter-stop. In a further embodiment, the flap is then inserted beyond the closing position, in a further development beyond the clearance position, for opening purposes, and the unlocking element is moved into the unlocking position, in a further embodiment only if the adjusting device is not locked. The flap can subsequently be opened. The unlocking element counteracts a rearward engagement of the counter-stop by the stop when the stop is moved past the counter-stop. In a further embodiment, the user only needs to insert the flap further and then release it for opening purposes, thereby bringing about a "push & release" functionality.

BRIEF DESCRIPTION OF THE DRAWINGS

The present invention will hereinafter be described in conjunction with the following drawing figures, wherein like numerals denote like elements, and:

FIG. 4 is the flap assembly on FIG. 3 with the adjusting device unlocked;

FIG. 5 is the flap assembly on FIG. 4, here in contrast further inserted in a position in the closing direction with an unlocking element in the unlocking position; and FIG. 6 is the flap assembly on FIG. 5 during retraction opposite the closing direction.

DETAILED DESCRIPTION

The following detailed description is merely exemplary in nature and is not intended to limit application and uses. Furthermore, there is no intention to be bound by any theory presented in the preceding background or summary or the following detailed description.

Figure 2:
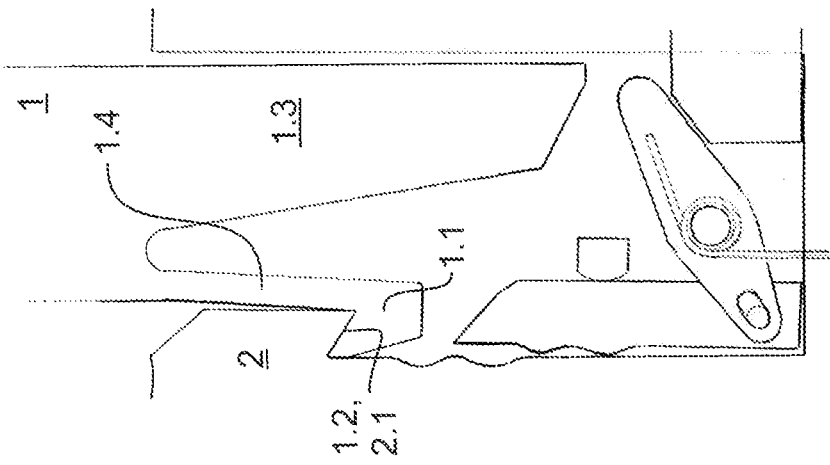
FIG. 2 is the flap assembly on FIG. 1, here in contrast inserted in a closing position in the closing direction.
Figure 3:
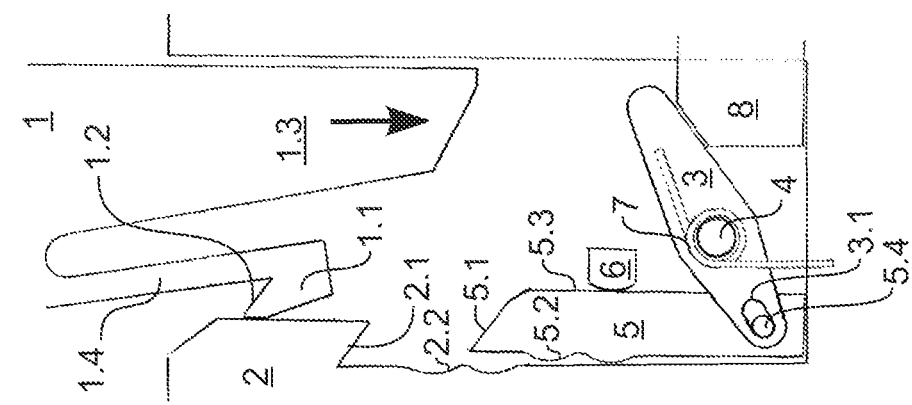
FIG. 3 is the flap assembly on FIG. 2, here in contrast further inserted in a clearance position in the closing direction with the adjusting device locked.

The sequence of figures from FIG. 1→FIG. 2→FIG. 3→FIG. 4→FIG. 5→FIG. 6→FIG. 7 shows the progression of a method for activating a flap assembly of a motor vehicle according to an embodiment, in particular for closing (FIG. 1→FIG. 2) through insertion in a closing position in the closing direction (FIG. 2), and subsequently opening (FIG. 4→FIG. 5→FIG. 6→FIG. 1) through further insertion after unlocking an adjusting means beforehand (FIG. 3→FIG. 4).

The flap assembly exhibits a base 2 that is secured to the body of the motor vehicle (not shown). The flap assembly further exhibits a fuel filler flap 1 with a latching element 1.1 and an unlocking plunger 1.3, which is mounted so that it can move relative to the base in a closing direction denoted on FIG. 1 by a vertical motion arrow. The fuel filler flap 1 is elastically pre-stressed against the closing direction by a spring arrangement (not shown).

The latching element 1.1 exhibits a stop 1.2 so as to engage a fixed, complementarily shaped counter-stop 2.1 of the base 2 from the back, and thereby positively prevent the fuel filler flap 1 from opening opposite the closing direction. The stop 1.2 is hook-shaped and inclined against the closing direction, wherein the stop 1.2 forms an angle with the closing direction in the closing position (see FIG. 2) that measures about 45°.

The latching element 1.1 is elastically deformable transverse to the closing direction. To this end, it exhibits a flexible hooked side arm 1.4, which is separated from the unlocking plunger 1.3 by a longitudinal groove. In the initial position shown on FIG. 1 situated upstream from the closing position on FIG. 2 in the closing direction, the latching element 1.1 is elastically pre-stressed transverse to the closing direction toward the counter-stop 2.1 by a guiding surface of the base extending parallel to the closing direction, so as to thereby latch in upon reaching the counter-stop 2.1.

Figure 1:
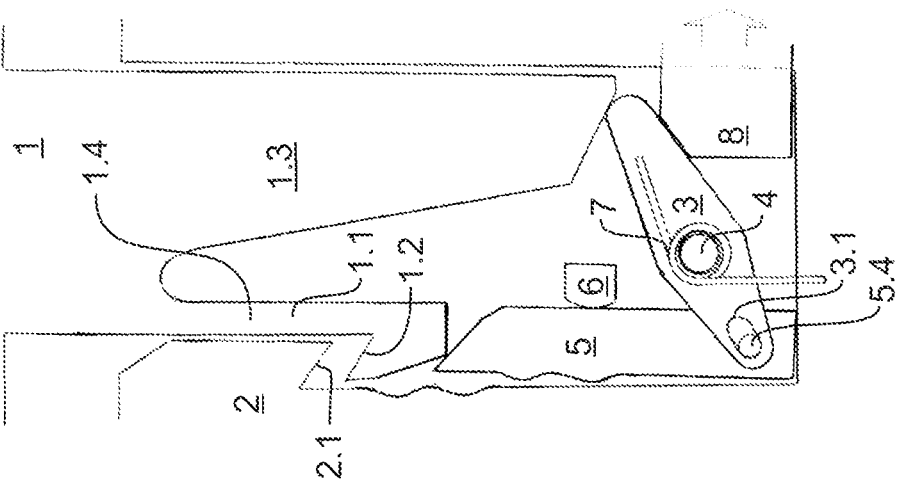
FIG. 1 is a flap assembly of a motor vehicle according to an embodiment in an initial position.

For closing purposes, the fuel filler flap 1 is moved in the closing direction until the stop 1.2 engages the counter-stop 2.1 from the back (FIG. 1→FIG. 2). The flap assembly exhibits a displaceably mounted unlocking element 5, which in an unlocking position (see FIG. 5, FIG. 6) prevents a rearward engagement of the counter stop 2.1 by the stop 1.2. The unlocking element is designed to cover and overhang the counter-stop 2.1, or project over the counter-stop, in the unlocking position. In the exemplary embodiment, the counter-stop 2.1 is formed or designed by a face of a grooved recess in the base 2. The unlocking element 5 is situated in this recess, and projects out of it, so that the stop 1.2 of the latching element 1.1 cannot mesh into the recess, and thereby engage the counter-stop 2.1 from the back. The unlocking element 5 exhibits a contact surface 5.3, which in the unlocking position positively guides the stop 1.2 past the counter-stop 2.1.

The flap assembly exhibits an adjusting device with a rocker 3 rotatably mounted around an axis 4, which is twisted by an insertion motion of the flap by its unlocking plunger 1.3, and in so doing mechanically moves the unlocking element 5, with which it is coupled by way of a gate slide in the form of a journal 3.1 sliding into an elongated hole 5.4, in the direction toward the unlocking position (FIG. 4→FIG. 5).

The adjusting device is set up to move the unlocking element 5 beyond a clearance position downstream from the closing position in the closing direction into the unlocking position only via an insertion motion of the flap in the closing direction. As evident from a joint review of FIG. 2, which shows the closing position, and FIG. 3, FIG. 4, which depict the clearance position, the unlocking plunger 1.3 must first overcome a clearance in the closing direction so as to move the rocker 3, and hence the unlocking element 5.

The adjusting device is elastically pre-stressed by a clock spring 7 against the unlocking position so as to try and distance the unlocking element 5 from the unlocking position. The adjusting device can be positively locked by a locking element, so as to prevent the unlocking element 5 from moving into the unlocking position. For this purpose, the locking element exhibits a movable locking element stop 8, which counteracts a motion by the rocker 3 to move the unlocking element 5 into the unlocking position. The locking element stop 8 is electromotively, pneumatically and/or hydraulically activated by a central locking system (not shown), in that it can be switched between a locked position (FIG. 3) and an unlocked position (FIG. 4).

If the flap 1 is inserted beyond the clearance position (FIG. 3, FIG. 4) in the closing direction proceeding from the closing position (FIG. 2), with the adjusting device having here been unlocked (FIG. 3→FIG. 4), the stop detaches from the counter-stop, and the unlocking element 5 is moved into the unlocking position (FIG. 4→FIG. 5). The unlocking element 5 is fixed in the unlocking position by the latching element 1.1 as long as it remains inserted beyond the closing position in the closing direction (FIG. 5, FIG. 6). For this purpose, the unlocking element 5 exhibits a gearing 5.2, which in the unlocking position interacts with a counter-gearing 2.2 of the base 2, so as to counteract a movement by the unlocking element 5 out of the unlocking position. In order to likewise be able to move the unlocking element 5 into the unlocking position, the unlocking element 5 is displaceably guided with clearance transverse to the gearing 5.2-2.2 by a fixed-base guide 6.

The latching element 1.1 frictionally fixes the unlocking element 5 in a position inserted beyond the closing position in a closing direction (FIG. 5, FIG. 6), in that the latching element 1.1 is elastically tensioned against the unlocking element 5 by the unlocking element 5, so as to in turn press the latter against the counter-gearing 2.2, and thereby fix it in place against the restoring torque of the clock spring 7.

The unlocking element 5 exhibits a run-up incline 5.1 for contacting the latching element 1.1, so as to improve the run-up by the latching element 1.1 onto the unlocking element 5. The run-up incline 5.1 passes over into the contact surface 5.3, which is set up to positively guide the stop 1.2 in the unlocking position. As a consequence, it exhibits a section that covers the counter-stop 2.1 in the unlocking position, and another section that overhangs the latter and forms part of the contact surface, which is set up to positively guide the stop 1.2 in the unlocking position.

The counter-stop 2.1 is complimentarily designed to the stop 1.2 and to the run-up incline 5.1 of the unlocking element 5, so that the unlocking element 5 can contact or engage from the back the counter stop 2.1 with its run-up incline 5.1 instead of the stop 1.2, thereby counteracting the rearward engagement of the counter-stop 2.1 by the stop 1.2, and likewise be fixed in the unlocking position by the counter-stop 2.1.

According to the sequence of figures from FIG. 1→FIG. 2→FIG. 3→FIG. 4→FIG. 5→FIG. 6→FIG. 1, the flap assembly is activated as follows: For closing purposes, the fuel filler flap 1 is moved in the closing direction until the stop 1.2 engages the counter-stop 2.1 from the back (FIG. 1→FIG. 2). For opening purposes, the flap 1 is inserted into the clearance position beyond the closing position (FIG. 2→FIG. 3). Once the adjusting device has been unlocked (FIG. 3→FIG. 4), the flap 1 can be inserted beyond the clearance position, whereby the unlocking plunger 1.3 of the flap 1 uses the rotatable rocker 3 to move the unlocking element 5 coupled therewith into the unlocking position (FIG. 4→FIG. 5). The latching element 1.1 here runs onto the contact surface 5.3 of the unlocking element 5 via the run-up incline 5.1, presses its gearing 5.2 against the counter-gearing 2.2 of the base 2, and in so doing fixes the unlocking element 5 in the unlocking position.

If the flap 1 is now released, its pre-stressed spring arrangement moves it opposite the closing direction, wherein the unlocking element 5 counteracts a rearward engagement of the counter-stop 2.1 by the stop 1.2 as the stop 1.2 is moved past the counter-stop 2.1 (FIG. 5→FIG. 6), thereby bringing about a "push & release" functionality. If the unlocking element 5 is not fixed in the unlocking position by the latching element 1.1 elastically pre-stressed against the latter, the clock spring 7 resets the unlocking element 5 from the unlocking position (FIG. 6→FIG. 1), so that the flap 1 can again be closed as described above.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A flap assembly for a motor vehicle, comprising:
   a base;
   a pre-stressed flap that is movably mounted relative to the base in a closing direction, the pre-stressed flap having a latching element with a stop, which in a closing position engages a counter-stop of the base from a back, so as to counteract an opening of the pre-stressed flap opposite the closing direction; and
   a unlocking element that in an unlocking position counteracts an engagement of the counter-stop by the stop from the back.

2. The flap assembly according to claim 1, further comprising a pre-stressed adjusting device that is configured to move the unlocking element into the unlocking position, wand mechanically activated by a movement of the pre-stressed flap in the closing direction.

3. The flap assembly according to claim 2, wherein the pre-stressed adjusting device is positively locked by a locking element, so as to counteract a movement by the unlocking element into the unlocking position.

4. The flap assembly according to claim 2, wherein the pre-stressed adjusting device comprises a rotatably mounted rocker coupled to the unlocking element.

5. The flap assembly according to claim 2, wherein the latching element is configured to move transverse to the closing direction.

6. The flap assembly according to claim 5, wherein the latching element is elastically deformable.

7. The flap assembly according to claim 1, wherein the unlocking element comprises a gearing, which in the unlocking position interacts with a counter-gearing of the base so as to counteract a movement by the unlocking element out of the unlocking position.

8. The flap assembly according to claim 1, further comprising a guide that is configured to guide the unlocking element with clearance transverse to the gearing.

9. The flap assembly according to claim 1, wherein the latching element frictionally fixes the unlocking element in a position inserted beyond the closing position in the closing direction.

10. The flap assembly according to claim 1, wherein the unlocking element covers the counter-stop in the unlocking position.

11. The flap assembly according to claim 1, wherein the stop is inclined opposite the closing direction forming an angle that is less than or equal to about 90°.

12. The flap assembly according to claim 1, wherein the unlocking element comprises a run-up contour that is configured to contact the latching element.

13. The flap assembly according to claim 1, wherein the counter-stop is complimentarily configured to the stop.

14. The flap assembly according to claim 1, wherein the pre-stressed flap is a fuel filler flap.

15. The flap assembly according to claim 1, wherein the latching element is pre-stressed transverse to the closing direction toward the counter-stop in a position upstream from the closing position in the closing direction.

16. The flap assembly according to claim 1, wherein the stop is inclined opposite the closing direction forming an angle is at most about 60°.

\* \* \* \* \*